United States Patent
Mizuta et al.

[11] Patent Number: 6,108,480
[45] Date of Patent: Aug. 22, 2000

[54] OPTICAL DEVICE WITH A GROOVE ACCURATELY FORMED

[75] Inventors: Satoru Mizuta; Hiroshi Nishimoto, both of Tokyo, Japan

[73] Assignee: NEC Corporation, Tokyo, Japan

[21] Appl. No.: 09/361,515

[22] Filed: Jul. 28, 1999

Related U.S. Application Data

[62] Division of application No. 08/781,810, Jan. 10, 1997, Pat. No. 5,961,683.

[30] Foreign Application Priority Data

Jan. 12, 1996 [JP] Japan ......................................... 8-21772

[51] Int. Cl.$^7$ ..................................................... G02B 6/136
[52] U.S. Cl. ............................................... 385/129; 385/49
[58] Field of Search ............................... 385/49, 52, 129, 385/130

[56] References Cited

U.S. PATENT DOCUMENTS

| | | | |
|---|---|---|---|
| 5,355,386 | 10/1994 | Rothman et al. | 372/50 |
| 5,471,552 | 11/1995 | Wuu et al. | 385/49 |
| 5,481,629 | 1/1996 | Tabuchi | 385/14 |
| 5,499,732 | 3/1996 | Nishimoto | 216/24 |
| 5,557,695 | 9/1996 | Yamane et al. | 385/49 |
| 5,579,424 | 11/1996 | Schneider | 385/49 |
| 5,644,667 | 7/1997 | Tabuchi | 385/49 |

*Primary Examiner*—John D. Lee
*Attorney, Agent, or Firm*—Young & Thompson

[57] ABSTRACT

A first layer (2) and a second layer (3) are formed on a substrate (1). The first layer is made of a resist against a groove-sculpturing etchant used in etching the substrate while the second layer is made of an anti-corrosive material against dry etching. The second layer is at first patterned into a patterned second layer (3a) in the form of a groove-sculpturing mask pattern (8). With the patterned second layer used as a mask, the first layer is etched and patterned into a patterned first layer (2a) in the form of the above-mentioned mask pattern. With the patterned first layer used as a mask, the substrate is etched to form a groove (9).

2 Claims, 3 Drawing Sheets

OPTICAL DEVICE WITH A GROOVE ACCURATELY FORMED

CROSS-REFERENCE TO RELATED APPLICATIONS

This application is a division of application Ser. No. 08/781,810, filed Jan. 10, 1997 now, U.S. Pat. No. 5,961,683.

BACKGROUND OF THE INVENTION

This invention relates to an optical device and a method of manufacturing the optical device.

In order to manufacture an optical device comprising a combination of an optical waveguide of a fiber mount type and optical and electrical components, various methods have been proposed and put into practical use.

For example, Japanese Unexamined Patent Publication (A2) No. H06-347665 (347665/1994) discloses a method of manufacturing an optical device comprising an optical waveguide formed on a substrate on which optical components and electronic devices are mounted. According to this method, a mask pattern for use in sculpturing a V-shaped groove or a groove in the substrate and an electric wiring pattern are formed on the substrate (typically, silicon) by the use of a metal material, such as Au, Al, W, and WSi, which is resistant to an anisotropic etchant and is electrically conductive. On the substrate with the mask and the electric wiring patterns, the optical waveguide is formed by the use of a silica glass material. In order to reduce the production cost, the above-mentioned publication teaches to eliminate a process carried out in presence of step configurations so that high-efficiency optical coupling is achieved between the optical components and the optical waveguide and that mass production on a substrate scale is enabled in all manufacturing steps, including the formation of electrode pads and the electric wiring pattern for the electronic devices. To this end, positioning marks for positioning the optical components such as an optical fiber and an optical semiconductor device, alignment marks for aligning an optical axis of the optical waveguide, the mask pattern, the electric wiring pattern for the optical components and the electronic devices, and the electrode pads are formed on the substrate prior to the formation of the optical waveguide.

As will later be described with reference to the drawings the optical waveguide is partially etched by wet etching or dry etching to define an end plane thereof and to partially expose a substrate surface. Thereafter, the substrate is subjected to anisotropic etching with the mask pattern used as an anisotropic etching mask to form the groove in the substrate. The groove serves to mount the optical fiber.

In the above-mentioned prior art techniques, the mask pattern and the electric wiring pattern are formed before the step configurations are produced by the formation of the optical waveguides. In other words, the mask pattern and the electric wiring pattern are formed on a flat surface of the substrate. This allows mass production of the optical device on a wafer scale by the use of a photolithography process.

However, the above-mentioned prior art technique has following disadvantages.

Specifically, the anisotropic etching mask formed of the above-mentioned metal material may often be altered in characteristic under the influence of the process of forming the optical waveguides over the mask pattern. This is because the heat produced in this process as well as dopant and moisture present in the optical waveguides are inevitably diffused into the mask pattern.

Due to such alteration in characteristic, the anisotropic etching mask loses its resist characteristic against an etchant and no longer serves as a mask. In this situation, the groove of a desired configuration is difficult to obtain.

As a consequence, it is impossible to accurately and reliably mount the optical fiber in the groove.

SUMMARY OF THE INVENTION

It is therefore an object of this invention to provide a method of manufacturing an optical device, which is capable of accurately and reliably forming a groove in substrate without being influenced by a process of forming an optical waveguide on the substrate.

It is another object of this invention to provide a method of manufacturing an optical device, which enables an optical fiber to be accurately and reliably mounted by the use of a groove formed in a substrate.

It is still another object of this invention to provide a method of manufacturing an optical device, which enables a principal substrate and a fiber guide substrate to be accurately and reliably coupled with each other by the use of a groove formed in a principle substrate.

It is yet another object of this invention to provide a method of manufacturing an optical device having a mounting structure which allows an optical fiber to be coupled with an optical waveguide without requiring any special adjustment.

Other objects of this invention will become clear as the description proceeds.

According to an aspect of this invention, there is provided a method of manufacturing an optical device having a groove. The method comprises the steps of forming on a substrate a first layer of a first resist against a groove-sculpturing etchant, forming on the first layer a second layer of a second resist against dry etching, patterning the second layer into a patterned second layer having a form relating to the groove, carrying out dry etching with the patterned second layer used as a mask to pattern the first layer into a patterned first layer, and etching the substrate with the patterned first layer used as a mask to form the groove in the substrate.

According to another aspect of this invention, there is provided an optical device comprising an optical waveguide formed on a substrate to be optically coupled with an optical fiber mounted on the substrate. The optical device comprises a first layer formed on the substrate and comprising a resist against an etchant used in etching of the substrate, a second layer formed on the first layer and comprising a resist against dry etching, the first and the second layers being patterned into patterned first and patterned second layers in the form of a groove-sculpturing mask pattern used in etching the substrate, and a groove formed on the substrate by etching the substrate with the patterned first layer used as a mask. The optical waveguide formed on the substrate is optically coupled with the optical fiber mounted in the groove formed on the substrate in exact alignment with an optical axis of the optical fiber.

Herein, description will be made as regards a principle of this invention. The formation of a waveguide end plane and the exposure of an etch surface of the substrate are simultaneously carried out by dry etching. In this process, the patterned second layer having corrosion resistance to dry etching and patterned in the form of the groove-sculpturing mask pattern serves as the mask in dry etching the first layer under the patterned second layer. Thus, the first layer is patterned into the patterned first layer also in the form of the groove-sculpturing mask pattern. The patterned first layer is made of the resist against the groove sculpturing etchant and serves as the mask in etching the substrate to form the groove.

Accordingly, even if the second layer is formed of the material inherently having no corrosion resistance to the groove-sculpturing etchant or a material losing the corrosion resistance to the groove-sculpturing etchant under the influence of the process of forming the optical waveguide on the second layer, the groove-sculpturing mask pattern is exactly reproduced as the patterned first layer without any damage.

It is therefore possible to accurately and reliably form the groove-sculpturing mask pattern without being influenced by the process of forming the optical waveguide.

DESCRIPTION OF THE PREFERRED EMBODIMENT

Figure 1:
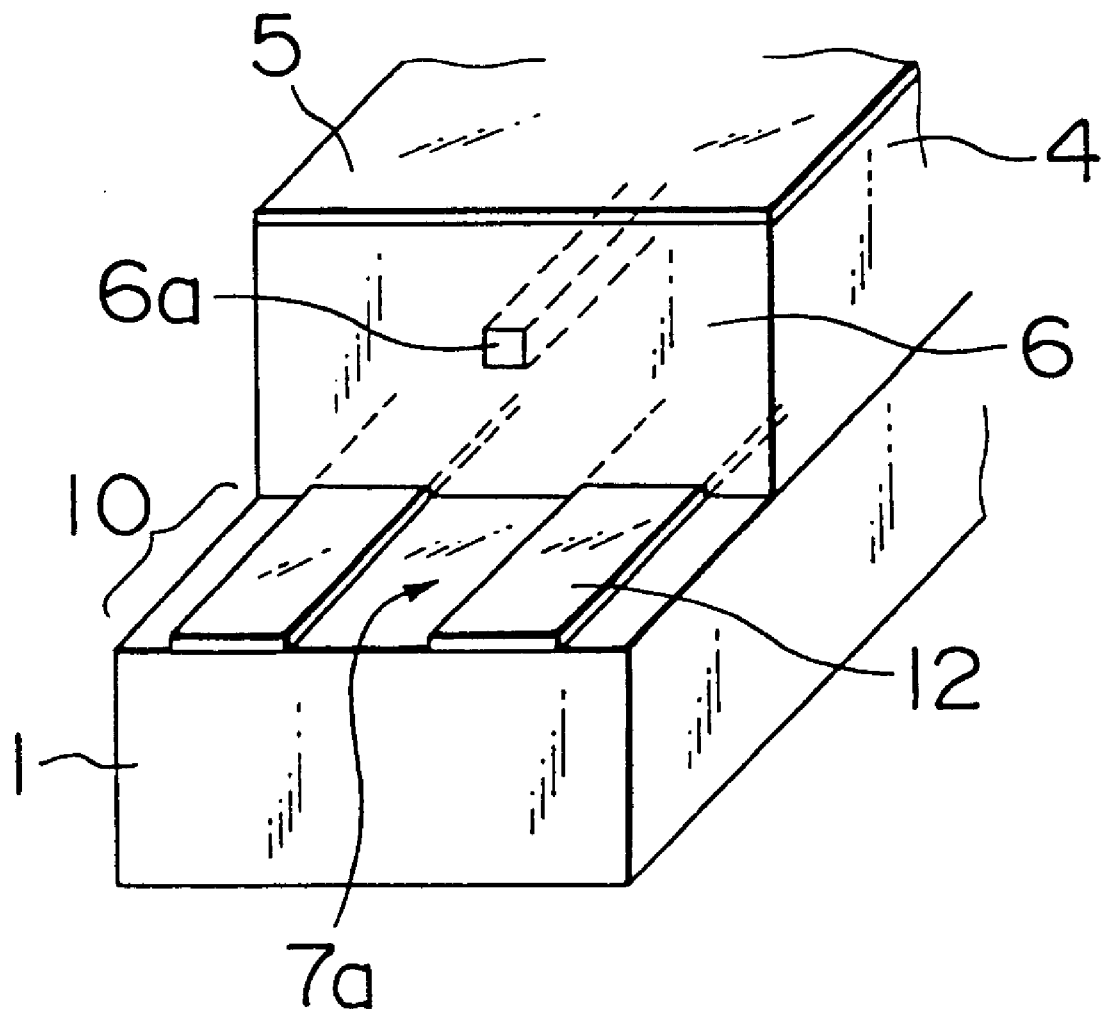
FIG. 1 is a view for describing a conventional process of forming a groove-sculpturing mask pattern.

In order to facilitate an understanding of this invention, a conventional method of manufacturing an optical device will be described in conjunction with FIG. 1. As shown in the figure, a mask pattern 12 is formed on a silicon substrate 1. On the silicon substrate 1 with the mask pattern 12, an optical waveguide layer 4 is formed. Thereafter, wet etching or dry etching is carried out with a mask film 5 used as a mask to define a waveguide end plane 6 with a waveguide core end 6a and to a substrate surface 7a.

Thereafter, anisotropic etching is carried out with the mask pattern 12 used as a mask to form a V-shaped groove or a groove in the substrate 1. The groove serves to mount an optical fiber.

Now, description will be made in detail as regards this invention with reference to the drawings.

Referring to FIGS. 2A through 2E, a method of manufacturing an optical device according to one embodiment of this invention will be described. At first referring to FIG. 2A, a silicon substrate 1 is prepared. A first layer 2 is formed on the silicon substrate 1. The first layer 2 is formed of a material having corrosion resistance to a groove-sculpturing etchant which is used in etching the substrate 1 in a later stage. For example, the first layer 2 is formed of a silica glass material containing silicon dioxide ($SiO_2$) as a main component. In the optical device, the first layer 2 comprises a silicon dioxide film.

The silicon dioxide film as the first layer 2 can be formed in various manners such as CVD (Chemical Vapor Deposition), sputtering, and thermal oxidation. Among others, the silicon dioxide film produced by thermal oxidation is very excellent in corrosion resistance to the groove-sculpturing etchant and, even with a reduced thickness, fully serves as a mask in etching the silicon substrate 1 in the later stage. For example, such silicon dioxide film is formed by annealing the silicon substrate 1 in a steam ($H_2O$) atmosphere.

It is noted here that, immediately before etching the silicon substrate 1 in the later stage, the silicon dioxide film as the first layer 2 is etched and patterned in the form of a groove-sculpturing mask pattern. Taking this into consideration, the silicon dioxide film is preferably reduced in thickness. With a reduced thickness, side etching of the silicon dioxide film is suppressed so that the accuracy in pattern formation is improved.

For the reason described above, the silicon dioxide film obtained by thermal oxidation is preferably used as the first layer 2 rather than that formed by CVD or sputtering.

In case where the silicon dioxide film obtained by thermal oxidation is used as the first layer 2, the thickness of the silicon dioxide film is typically selected within a range approximately between 100 nanometers and one micrometer. This range is determined with reference to a selection ratio between silicon dioxide and silicon in etching the silicon substrate 1 by the use of a KOH solution as the groove-sculpturing etchant.

The first layer 2 may be formed of any other appropriate material instead of silicon dioxide described above. For example, the first layer 2 may comprised a silicon nitride ($Si_3N_4$) film formed by thermal nitriding, specifically, by annealing the silicon substrate 1 in an ammonia ($NH_3$) atmosphere. Alternatively, the silicon nitride film may be formed by CVD or sputtering.

Then, on the first layer 2, a second layer 3 is deposited by sputtering or vapor deposition.

The second layer 3 is formed of a material having a sufficiently low etch rate (in other words, having a sufficiently high selection ratio) in dry etching by the use of a reactive gas such as $C_xF_y$ and $C_xCl_y$ in the forms of ions, radicals, or neutral molecules, as compared with an optical waveguide layer which will later be described. Specifically, the second layer 3 may comprise a metal film formed of a metal material, such as gold (Au), aluminum (Al), tungsten (W), tungsten silicide (WSi), or chromium (Cr), and having a thickness on the order of several hundreds nanometers to one micrometer.

Figure 2A:
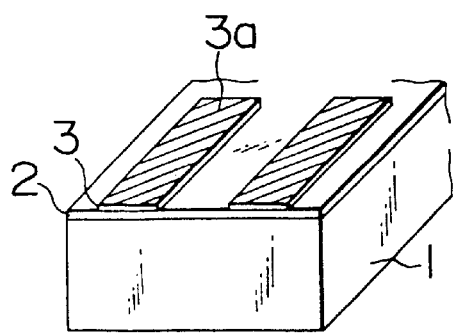
FIGS. 2A through 2E are views for describing a method of manufacturing an optical device according to one embodiment of this invention.

As illustrated in FIG. 2A, the second layer 3 is patterned into a patterned second layer 3a in the form of the groove-sculpturing mask pattern. For example, patterning is carried out by a combination of photolithography and wet etching using chemicals or ECR (Electron Cyclotron Resonance) plasma etching using argon (Ar) ion plasma.

Figure 3:
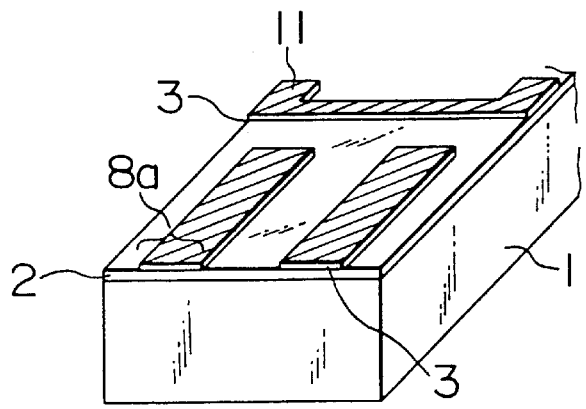
FIG. 3 is a view similar to FIG. 2A, in which a groove-sculpturing mask pattern and an electric wiring pattern are simultaneously formed.

Inasmuch as the second layer 3 is formed of the above-mentioned metallic material, the second layer 3 can be used also as an electric wiring lay adapted to flow high-speed signals. Temporarily referring to FIG. 3, the second layer 3 is separately patterned into a groove-sculpturing mask pattern 8a and an electric wiring pattern 11 of a desired shape. Thus, the electric wiring layer insulated from the silicon substrate 1 can be formed.

Figure 2B:
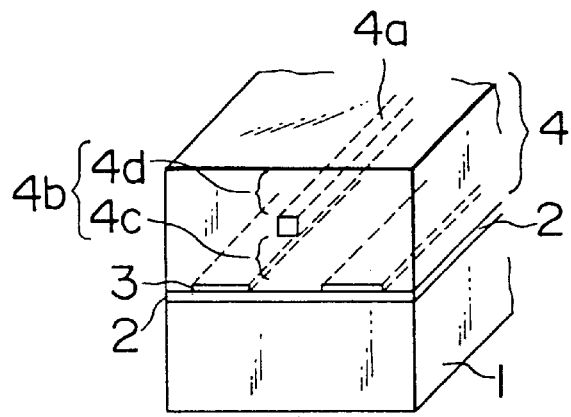

Turning to FIG. 2B, an optical waveguide layer 4 is formed on the first layer 2 and the patterned second layer 3a. The optical waveguide layer 4 is made of, for example, silica glass containing P, Ge, B, or the like and comprises a waveguide core layer 4a and a waveguide cladding layer 4b. The waveguide core layer 4a and the waveguide cladding layer 4b will be referred to as a core portion and a surrounding portion, respectively.

The optical waveguide layer 4 is formed by a combination of deposition (such as CVD or flame deposition) of the waveguide core layer 4a and the waveguide cladding layer 4b and etching (such as dry etching by RIE (Reactive Ion Etching) of the waveguide core layer 4a.

As illustrated in FIG. 2B, the optical waveguide layer 4 typically has a structured such that the waveguide core layer 4a is embedded in the waveguide cladding layer 4b composed of a lower cladding layer 4c and an upper cladding layer 4d.

Preferably, the optical waveguide layer 4 has a size which is given below. The lower cladding layer 4c has a thickness between 10 and 20 micrometers. The waveguide core layer 4a has a square sections of about 5×5 micrometers. The upper cladding layer 4d has a thickness on the order of 10 micrometers.

The waveguide core layer 4a has a refractive index slightly higher than that of the lower and the upper cladding layers 4c and 4d so that the difference Δn in refractive index is on the order of 5% for example. In this case, the optical waveguide layer 4 is of a single-mode type.

In the method according to this invention, the optical waveguide layer 4 is not restricted to the single-mode type but may be a multi-mode type. As a material of the optical waveguide layer 4, not only silica glass but also PMMA or fluorine polyimide can be used.

Figure 2C:
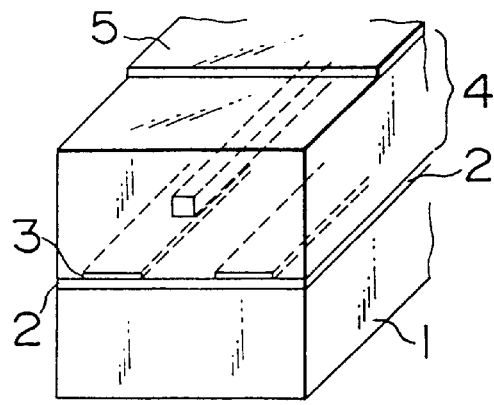

Turning to FIG. 2C, an end plane forming mask 5 is formed on the optical waveguide layer 4 in the following manner. A metal film such as Cr and Ti is deposited to a thickness between several tens and several hundreds nanometers. On the metal film a photoresist is deposited to a thickness between several micrometers and several tens micrometers. Then, photomicrography is carried out to leave the end plane forming mask 5 in the form of a desired mask pattern. As illustrated in FIG. 2C, the end face forming mask 5 covers an upper surface of the optical waveguide layer 4 in an area desired to be left while a remaining area is left uncovered. The remaining area corresponds to a position where a V-shaped groove or a groove 9 (FIG. 2E) is to be formed in the silicon substrate 1 as will later be described.

Thereafter, the optical waveguide layer 4 and the first layer 2 are etched in the remaining area which is not covered by the end plane forming mask 5. The etching operation is carried out until a substrate surface 7 is exposed. At this time, the optical waveguide layer 4 has a waveguide end plane 6, as illustrated in FIG. 2D.

By way of example, consideration will be made as regards the optical waveguide layer 4 of silica glass. In this case, the above-mentioned etching operation is generally carried out by dry etching using ions, radicals, neutral molecules of the reactive gas such as $C_xF_y$ or $C_xCl_y$, so as to suppress side etching. During the etching operation, the patterned second layer 3a in the form of the groove-sculpturing mask pattern depicted at 8 in the figure is not substantially etched and remains as a mask in dry etching. This is because the patterned second layer 3a is formed of the material having a sufficiently low etch rate (in other words, having a high selection ratio) in dry etching using the reactive gas, as compared with the optical waveguide layer 4.

Figure 2D:
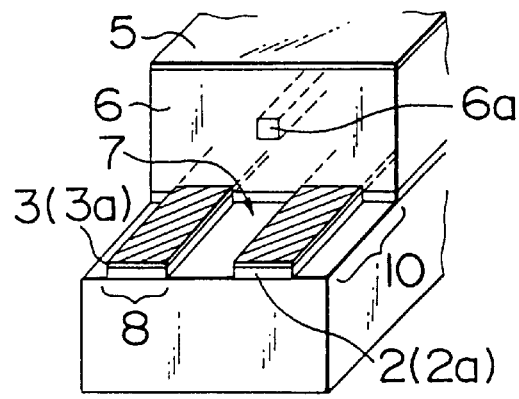

As a consequence, the first layer 2 under the patterned second layer 3a is patterned into a patterned first layer 2a in the form of the groove-sculpturing mask pattern 8, as illustrated in FIG. 2D.

Preferably, the patterned first layer 2a is formed of the silica glass material containing silicon dioxide ($SiO_2$) as a main component. Therefore, for the groove-sculpturing etchant (for example, the KOH solution) used in etching the silicon substrate 1, the patterned first layer 2a has an etch rate considerably smaller than that of the silicon substrate 1. The etch rate of the patterned first layer 2a is variable in dependence upon a film forming process (for example, thermal oxidation of silicon, CVD, or sputtering) and an impurity concentration of the silicon dioxide film as the first layer 2. For example, when the first layer 2 of silicon dioxide is formed by thermal oxidation and the KOH solution is used as the groove-sculpturing etchant, the patterned first layer 2a has an etch rate between one to several hundreds and one to one thousand of that of the silicon substrate 1. Accordingly, the patterned first layer 2a can be used as a mask in etching the silicon substrate 1.

In the above-mentioned dry etching, side etching can be suppressed by the use of RIE excellent in vertical linearity. In this event, the groove-sculpturing mask pattern 8 is exactly and accurately reproduced in the patterned first layer 2a.

As a result, the groove-sculpturing mask pattern 8 as the patterned first layer 2a is formed in a groove-sculpturing area 10 while the substrate surface 7 is exposed in a portion without the mask pattern 8, as illustrated in FIG. 2D.

Herein, it is possible to replace a part of the above-mentioned dry etching by wet etching.

Figure 4:
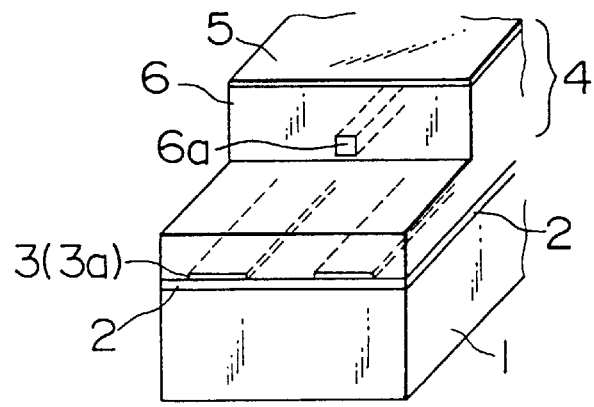
FIG. 4 is a view similar to FIG. 2D, in which a part of dry etching is replaced by wet etching.

Specifically, consideration will be made about etching of an optical waveguide of silica glass by way of example. Temporarily referring to FIG. 4, the optical waveguide layer 4 is etched to a certain depth by wet etching using buffered fluoric acid (mixed solution of ammonium fluoride and hydrogen fluoride). It is noted here that the "certain depth" is a depth such that the first layer 2 is not exposed. Typically, the optical waveguide layer 4 is etched to leave a thickness between several tens nanometers (several hundreds angstroms) and 1 micrometer, taking the thickness of the optical waveguide layer 4 and the fluctuation in etching rate into consideration. The wet etching is followed by the dry etching. As a consequence, the groove-sculpturing mask pattern 8 as the patterned first layer 2a can be formed with a high accuracy.

Figure 2E:
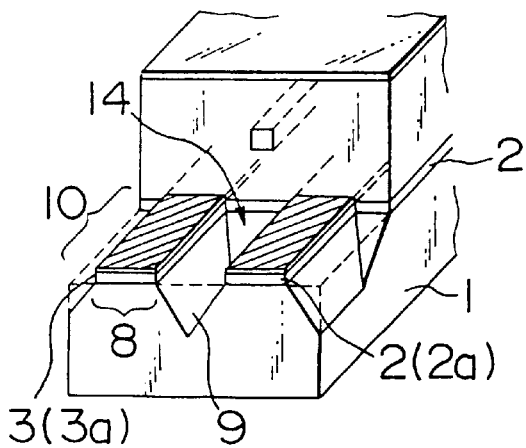

Turning to FIG. 2E, the substrate 1 is etched with the patterned first layer 2a used as a mask to form the groove 9 in the substrate 1.

For example, the groove 9 is formed by anisotropic etching of the silicon substrate 1 by the use of the groove-sculpturing etchant such as the above-mentioned KOH solution, a NaOH solution, a CsOH solution, a mixed solution of ethylenediamine and pyrocatechol, or hydrazine.

Finally, an optical fiber is mounted with the groove 9 used as a guide groove.

Even if the second layer 3 is formed of a material inherently having no corrosion resistance to the groove-sculpturing etchant or a material losing the corrosion resistance to the groove-sculpturing etchant under the influence of the process of forming the optical waveguide layer over the second layer 3, it is possible according to the above-mentioned method to accurately and reliably form the groove-sculpturing mask pattern 8 comprising the patterned first layer 2a without being influenced by the process of forming the optical waveguide layer.

Experimentally, the first layer 2 of the silicon dioxide film was formed on the silicon substrate 1 by thermal oxidation. Then, the second layer 3 of a tungsten silicide film was deposited on the first layer 2 and patterned into the patterned second layer 3a in the form of a groove sculpturing mask pattern. Over the first and the second layers 2 and 3, the optical waveguide layer 4 of silica glass was formed.

Then, dry etching was carried out by RIE using buffered fluoric acid to remove the optical waveguide layer 4 and the first layer 2 in a desired area as a V-shaped groove sculpturing area. As a consequence, the first layer 2 was patterned into the patterned first layer 2a in the form of the V-shaped groove sculpturing mask pattern with an accuracy on the order of submicron which is substantially equivalent to that achieved in photolithography.

Thereafter, the silicon substrate 1 was subjected to anisotropic etching by the use of the etchant comprising the KOH solution and isopropyl alcohol added thereto. The patterned first layer 2a of the silicon dioxide film acted as a high-accuracy mask without any substantial deformation by the immersion in the etchant. As a result, a desired groove was obtained at the yield of about 95% or more.

In this state, however, the optical fiber could not be mounted in a proper position. Specifically, as a result of the anisotropic etching, the silicon substrate 1 has a (111) plane 14 (FIG. 2E and 5) adjacent to the end plane 6 of the optical waveguide layer 4. The (111) plane 14 would collide with a fiber end of the optical fiber to inhibit the fiber end from complete contact with the end plane 6 of the optical waveguide layer 4.

Figure 5:
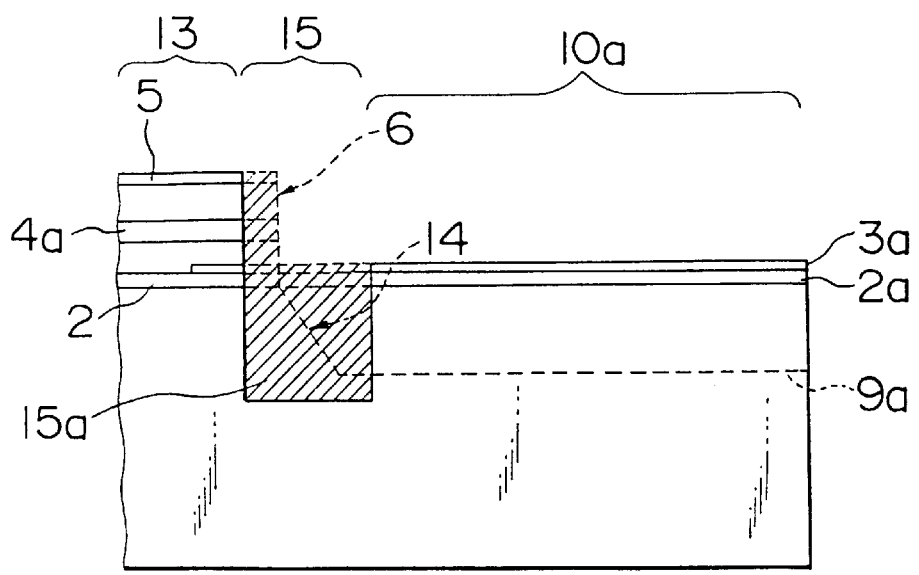
FIG. 5 is a view corresponding to FIG. 2E, in which a cut groove is formed at a boundary region between a V-shaped groove and an optical waveguide.

In view of the above, a cut groove 15 was formed between a groove sculpturing area 10a and an optical waveguide area 13 by the use of a dicing saw, as illustrated in FIG. 5. The cut groove 15 had a width between 100 and 200 micrometers and a depth greater than that of a V-shaped groove 9a. Thus, the (111) plane 14 which would collide with the fiber end (not shown) is removed. In the figure, a hatched portion 15a represents a sectional shape of a portion removed by the dicing saw.

Thereafter, the optical fiber was mounted in the groove 9a. Thus, the optical fiber was mounted in proper alignment with the optical waveguide layer of silica glass without requiring any special adjustment.

According to the method described above, the guide groove for mounting the optical fiber can be reliably and accurately formed in the substrate without being influenced by the process of forming the optical waveguide layer. Therefore, the optical fiber can be accurately mounted on the substrate having the optical waveguide layer without requiring any special adjustment. This enables mass-production which results in reduction of the production cost. Furthermore, the metal material excellent in electric characteristic such as a high-frequency characteristic can be used as the second layer. Therefore, the electric wiring pattern insulated from the silicon substrate can be simultaneously formed from the second layer on the same substrate. Thus, it is possible to further reduce the production cost.

While this invention has thus far been described in conjunction with the preferred embodiment, it will readily be understood for those skilled in the art to put this invention into practice in various other manners. In the foregoing description, the groove for mounting the optical fiber is formed on the same substrate on which the optical waveguide layer is formed. However, this invention is not restricted to the above-mentioned instance.

For example, this invention is also applicable to the case where two substrates are separately prepared one of which is provided with an optical waveguide layer and the other of which is provided with a groove as a guide groove for guiding the optical fiber. As a particular case, these substrates are coupled by the use of a coupling groove formed in at least one of the substrates. In the particular case, the coupling groove can be formed according to the method of this invention.

In the foregoing, description has been made assuming the case where the V-shaped groove is formed on the (100) silicon substrate by the anisotropic etching. However, a different type of the silicon substrate, for example, a (110) silicon substrate may be used in this invention as far as any groove configuration is formed in the substrate by etching. When the (110) silicon substrate is used, the groove does not have a V shape. Even in this event, a similar groove-sculpturing mask pattern can be formed with a high reliability and a high accuracy according to the method of this invention.

Furthermore, the substrate may be formed of a material other than silicon. This invention is also applicable to an indium phosphide (InP) crystal substrate or a gallium arsenide (GaAs) crystal substrate if an etchant is appropriately selected.

What is claimed is:

1. An optical device comprising an optical waveguide formed on a substrate to be optically coupled with an optical fiber mounted on said substrate, said optical device comprising:

a first layer formed on said substrate and comprising a first resist against an etchant used in etching of said substrate;

a second layer formed on said first layer and comprising a second resist against dry etching, said first and said second layers being patterned into patterned first and patterned second layers in the form of a groove-sculpturing mask pattern used in etching said substrate; and a groove formed on said substrate by etching said substrate with said patterned first layer used as a mask;

said optical waveguide formed on said substrate being optically coupled with said optical fiber mounted in said groove formed on said substrate in exact alignment with an optical axis of said optical fiber.

2. An optical device as claimed in claim 1, wherein said first layer comprises an insulating member, said second resist comprises a conductive member, and said second resist is further patterned to define an electric wiring.

* * * * *